(12) United States Patent
Hu

(10) Patent No.: US 10,076,007 B2
(45) Date of Patent: Sep. 11, 2018

(54) APPARATUS FOR CONTROLLING BRIGHTNESS OF MOBILE PHONE SCREEN

(71) Applicant: Beijing Taitan Technology Co. Ltd., Beijing (CN)

(72) Inventor: Guohui Hu, Beijing (CN)

(73) Assignee: GUANGZHOU XINGPU ELECTRONIC TECHNOLOGY CO., LTD., Guangzhou, Guangdong Province (CN)

( * ) Notice: Subject to any disclaimer, the term of this patent is extended or adjusted under 35 U.S.C. 154(b) by 0 days.

(21) Appl. No.: 15/396,397

(22) Filed: Dec. 30, 2016

(65) Prior Publication Data

US 2018/0184494 A1   Jun. 28, 2018

(30) Foreign Application Priority Data

Dec. 27, 2016  (CN) .......................... 2016 1 1224540

(51) Int. Cl.
*H05B 33/08* (2006.01)
*H04M 1/22* (2006.01)

(52) U.S. Cl.
CPC .......... *H05B 33/0845* (2013.01); *H04M 1/22* (2013.01); *H05B 33/0815* (2013.01); *H05B 33/0824* (2013.01); *H05B 33/0887* (2013.01)

(58) Field of Classification Search
CPC ................ H05B 33/08; H05B 33/0812; H05B 33/0815; H05B 33/0845; H05B 33/083; H05B 33/0824; H05B 33/0851; Y02B 20/346; Y02B 20/347; Y02B 20/348
See application file for complete search history.

(56) References Cited

U.S. PATENT DOCUMENTS

| | | | |
|---|---|---|---|
| 2014/0042918 A1* | 2/2014 | Lee ................... | H05B 33/0809 315/185 R |
| 2014/0197741 A1* | 7/2014 | Sakai ................. | H05B 33/0824 315/123 |
| 2014/0265888 A1* | 9/2014 | Ekbote .............. | H05B 33/0809 315/186 |
| 2015/0373802 A1* | 12/2015 | Kim .................. | H05B 33/0815 315/200 R |

* cited by examiner

Primary Examiner — Thai Pham
(74) Attorney, Agent, or Firm — Cheng-Ju Chiang

(57) ABSTRACT

The present invention discloses an apparatus for controlling brightness of a mobile phone screen, which includes a light source module, configured to provide a light source for the mobile phone screen; a rectifier processing module connected to the light source module, configured to rectify an input power source; a silicon-controlled dimmer connected to the rectifier processing module, configured to adjust brightness of the light source; and a first constant current controller processing module connected to the rectifier processing module and the light source module, configured to provide an anode forward current necessary to sustain conduction of the silicon-controlled dimmer.

8 Claims, 3 Drawing Sheets

APPARATUS FOR CONTROLLING BRIGHTNESS OF MOBILE PHONE SCREEN

TECHNICAL FIELD

The present invention relates to the technical field of mobile phones, and more particularly, to an apparatus for controlling brightness of a mobile phone screen.

BACKGROUND

With the emergence of smart phones, the screen of a mobile phone has become the most important component in the mobile phone, generally, in different usage environments, it is necessary to adjust the brightness of a mobile phone screen according to the specific condition, for example, in a dark environment, it is necessary to increase the brightness of the screen of the mobile phone, or in the strong light, the brightness of the mobile phone is increased for ease of viewing, in the prior art, however, flicker may occur when adjusting and switching the screen brightness of the mobile phone, and this may be harmful to the user's health after long-term use, how to conveniently adjust the brightness of the mobile phone screen is a problem faced by the industry.

SUMMARY

In view of this, embodiments of the present invention provide an apparatus for controlling brightness of a mobile phone screen, which can solve some or all of the above problems, therefore, the problem of screen flickering in a switch changeover state can be avoided, the circuit realized therefrom has a high power factor, is simple in structure, easy to adjust, and low in the cost.

To solve the above technical problems, the present invention adopts the technical solutions as follows:

An apparatus for controlling brightness of a mobile phone screen according to the embodiments of the present invention, including a mobile phone screen display processing unit, moreover, further including a mobile phone screen brightness control unit connected to the mobile phone screen display processing unit, wherein the mobile phone screen brightness control unit particularly includes:

a light source module, configured to provide a light source for the mobile phone screen;

a rectifier processing module connected to the light source module, configured to rectify an input power source;

a silicon-controlled dimmer connected to the rectifier processing module, configured to adjust brightness of the light source; and a first constant current controller processing module connected to the rectifier processing module and the light source module, configured to provide an anode forward current necessary to sustain conduction of the silicon-controlled dimmer.

The apparatus for controlling brightness of a mobile phone screen according to the embodiments of the present invention, including a light source module, configured to provide a light source for the mobile phone screen; a rectifier processing module connected to the light source module, configured to rectify an input power source; a silicon-controlled dimmer connected to the rectifier processing module, configured to adjust brightness of the light source; and a first constant current controller processing module connected to the rectifier processing module and the light source module, configured to provide an anode forward current necessary to sustain conduction of the silicon-controlled dimmer. As such, the silicon-controlled dimmer can start up quickly in the next period, and the problem of screen flickering in a switch changeover state can be avoided, what's more, since the silicon-controlled dimmer is switched on quickly, the active power of the circuit can be improved, that is, the circuit realized therefrom has a high power factor, so it is easy to adjust, simple in structure, and low in the cost.

BRIEF DESCRIPTION OF DRAWINGS

In order to illustrate the technical solutions in embodiments of the present invention or the prior art more clearly, accompanying drawings needed in the embodiments or the prior art are illustrated briefly as follows. Apparently, the accompanying drawings are merely certain of embodiments recorded in the present invention, and persons skilled in the art can derive other drawings from them.

DETAILED DESCRIPTION

The technical solutions in the embodiments of the present invention are hereinafter described clearly and completely with reference to the accompanying drawings in the embodiments of the present invention.

In the apparatus for controlling brightness of a mobile phone screen in the prior art, the mobile phone screen may flicker in a switch changeover state, a power factor (PF) value of the circuit is also reduced, during specific implementation, the LC filter at an input end of the apparatus for controlling brightness of a mobile phone screen in the prior art will cause the controllable silicon to oscillate, and such oscillation may create audio noise and flickering to driving power supplies, such as an LED.

However, the core of the present invention lies in that, the apparatus for controlling brightness of a mobile phone screen includes a light source module, configured to provide a backlight source for the mobile phone screen; a rectifier processing module connected to the light source module, configured to rectify an input power source; a silicon-controlled dimmer connected to the rectifier processing module, configured to adjust brightness of the light source; and a first constant current controller processing module connected to the rectifier processing module and the light source module, configured to control and provide an anode forward current necessary to sustain conduction of the silicon-controlled dimmer, therefore, although the silicon-controlled dimmer destroys the sinusoidal wave waveform, since the anode forward current necessary to sustain conduction of the silicon-controlled dimmer is sustained, the silicon-controlled dimmer can start up quickly in the next period, and the problem of screen flickering in a switch changeover state can be avoided, what's more, since the silicon-controlled dimmer is switched on quickly, the active power of the circuit can be improved, that is, the circuit realized therefrom has a high power factor, so it is easy to adjust, simple in structure, and low in the cost.

Figure 1:
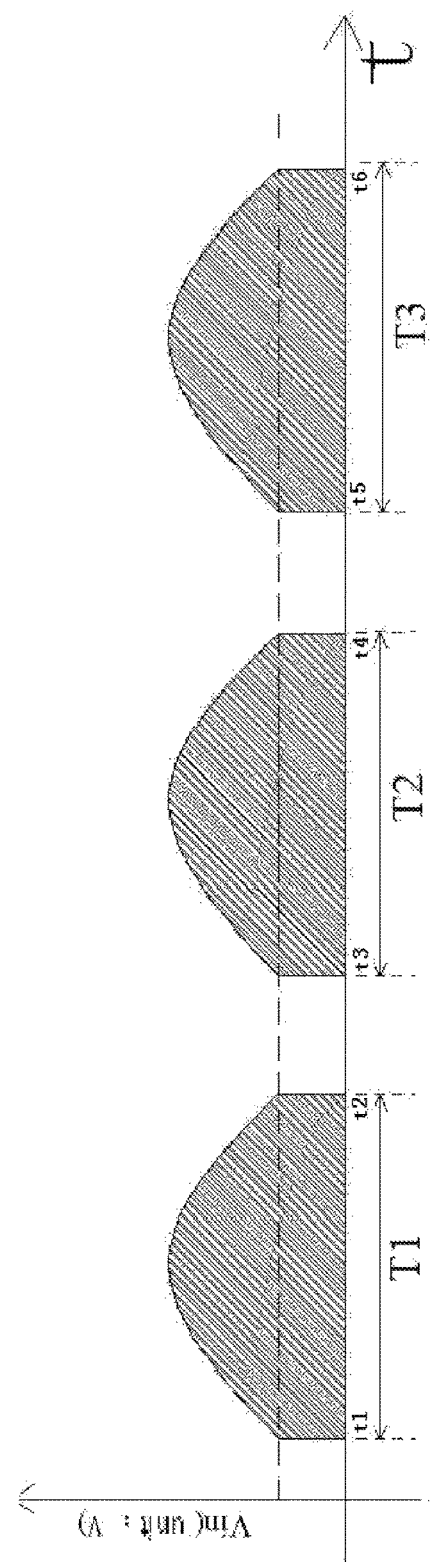
FIG. 1 is a bus voltage waveform diagram of an apparatus for controlling brightness of a mobile phone screen without an electrolytic capacitor after rectification according to the present invention.

Refer to FIG. 1, which is a bus voltage waveform diagram of an apparatus for controlling brightness of a mobile phone screen without an electrolytic capacitor after rectification according to an embodiment of the present invention.

As shown, the rectified bus voltage waveform in this embodiment is a non-sinusoidal wave, in particular, the silicon-controlled dimmer in this embodiment is triggered to be switched on at time t1, and triggered to be switched off at time t2, while the silicon-controlled dimmer is again triggered to be switched on at time t3 of another period, such a cycle is repeated, particularly, within an interval range of t2 and t3, the screen is blacked out, which will not repeated herein.

Figure 2:
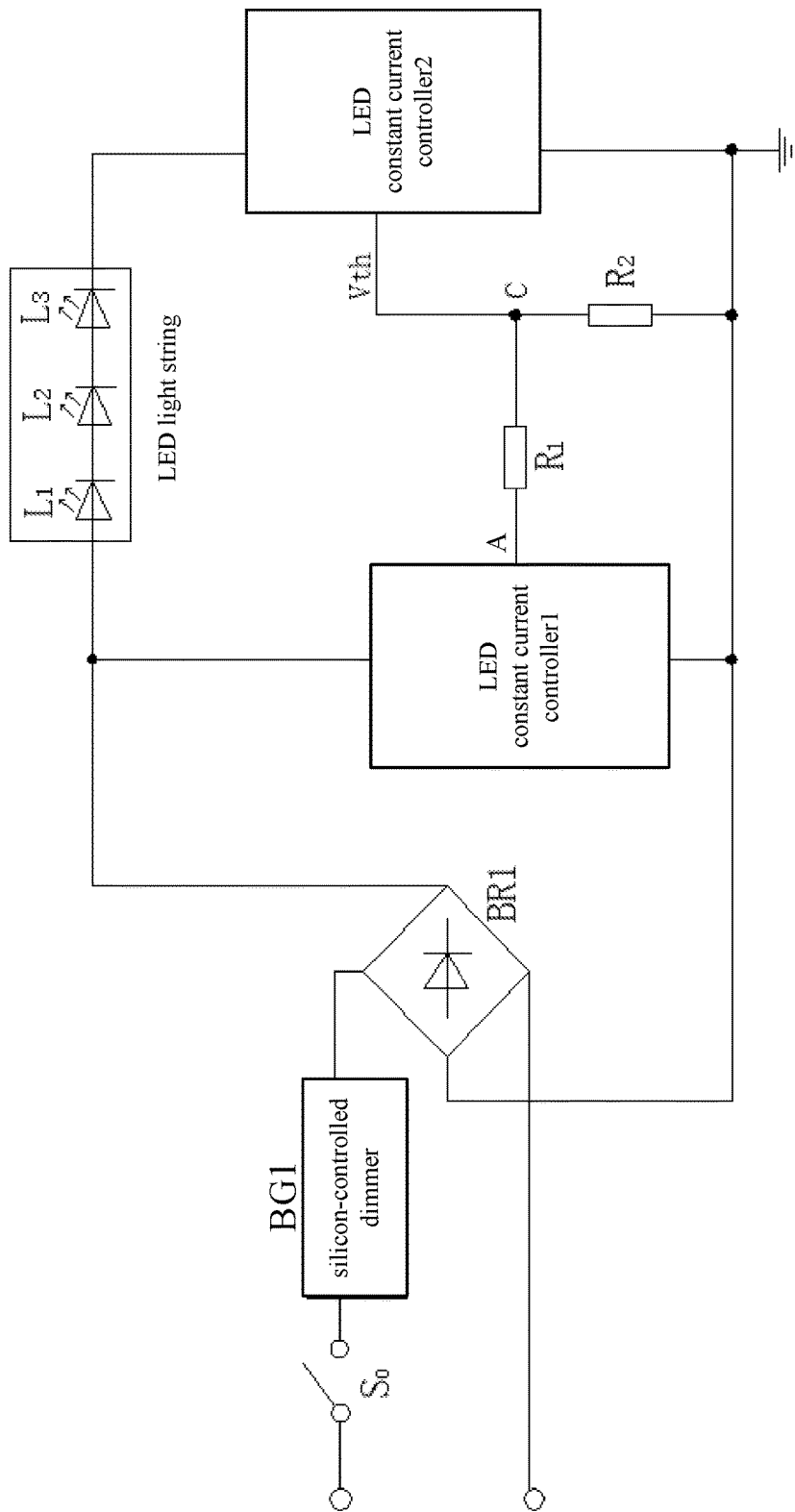
FIG. 2 is a structural schematic diagram of a circuit for an apparatus for controlling brightness of a mobile phone screen according to a first specific embodiment of the present invention.

Refer to FIG. 2, which is a structural schematic diagram of a circuit for an apparatus for controlling brightness of a mobile phone screen according to a first specific embodiment of the present invention.

In this embodiment, the silicon-controlled dimmer is adopted to control the load brightness of the light source for the mobile phone screen (such as an LED lamp), as a specific embodiment, taking an LED light source for the mobile phone screen as an example, the rectifier processing module can adopt a bridge rectifier BR1, the light source module can include a first LED light string and a second LED constant current controller processing module to perform constant current control on the first LED light string, the first LED constant current controller processing module can include a first LED constant current controller and a first resistor, the second LED constant current controller processing module can include a second LED constant current controller and a second resistor, additionally, for ease of input power source control, a power switch also can be included, in particular, the apparatus for controlling brightness of a mobile phone screen in this embodiment mainly includes:

a power switch S0, a silicon-controlled dimmer BG1, a bridge rectifier BR1, two LED constant current controllers: LED constant current controller 1 (i.e., a first LED constant current controller) and LED constant current controller 2 (i.e., a second LED constant current controller), a sampling resistor R1 (i.e., a first resistor) and a sampling resistor R2 (i.e., a second resistor), an LED light string (i.e., the first LED light string, in practice, the first LED light string includes at least one LED lamp bead, alternatively, for example, it may be the LED light string that includes three LED lamp beads or other numbers of LED lamp beads, which is not limited herein), and the specific connection relations of each element in the circuit are as follows:

the bridge rectifier BR1 is connected to the power supply via the power switch S0 and the silicon-controlled dimmer BG1, the positive phase output end of the bridge rectifier BR1 is connected to one end of the LED constant current driver 1 and the anode of the LED light string, the negative phase output end of the bridge rectifier BR1 is connected to other end of the LED constant current driver 1 and then grounded, the control terminal A of the LED constant current driver 1 is grounded via the sampling resistors R1 and R2, the sampling resistors R1 and R2 are connected via point C; the cathode of the LED light string is connected to one end of the LED constant current driver 2, the other end of the LED constant current driver 2 is grounded, and meanwhile, the control terminal B of the LED constant current driver 2 is grounded via the sampling resistor R2.

Hereinafter, the working process of the apparatus for controlling brightness of the mobile phone screen in this embodiment will be described in detail.

When the power switch is closed, within T1 period, the silicon-controlled dimmer BG1 is adjusted at time t1 to trigger to be switched on, when the bus voltage $Vin > V_{LED\ light\ string}$, the LED light string is ON, that is, the mobile phone screen is bright, then the LED constant current controller 2 drives the LED light string and controls the current of the LED light string, and the current flowing through the LED light string is: $I_{LED\ light\ string} = Vth/R2$;

When $Vin < V_{LED\ light\ string}$, the LED constant current controller 2 is closed, the LED light string is OFF, that is, the mobile phone screen is blacked out, the voltage at point C is less than the voltage at point A, the LED constant current controller 1 is switched on, to provide the sustaining current of the silicon-controlled dimmer BG1, $Ihold = VA/(R1+R2)$, VA indicates the voltage at point A;

Within T2 period, the silicon-controlled dimmer BG1 is again triggered to be switched on at time t3, the process is similar to the above and thus is not repeated herein.

To sum up, the apparatus for controlling brightness of a mobile phone screen in this embodiment provides an anode forward current necessary to sustain conduction of the silicon-controlled dimmer through the LED constant current driver 1, so that the silicon-controlled dimmer can start up quickly in the next period, and the problem of screen flickering in a switch changeover state can be avoided, for example, the LED lamp flickers, what's more, since the silicon-controlled dimmer is switched on quickly, the active power of the circuit can be improved, that is, the circuit realized therefrom has a high power factor, so it is easy to adjust, simple in structure, and low in the cost.

Figure 3:
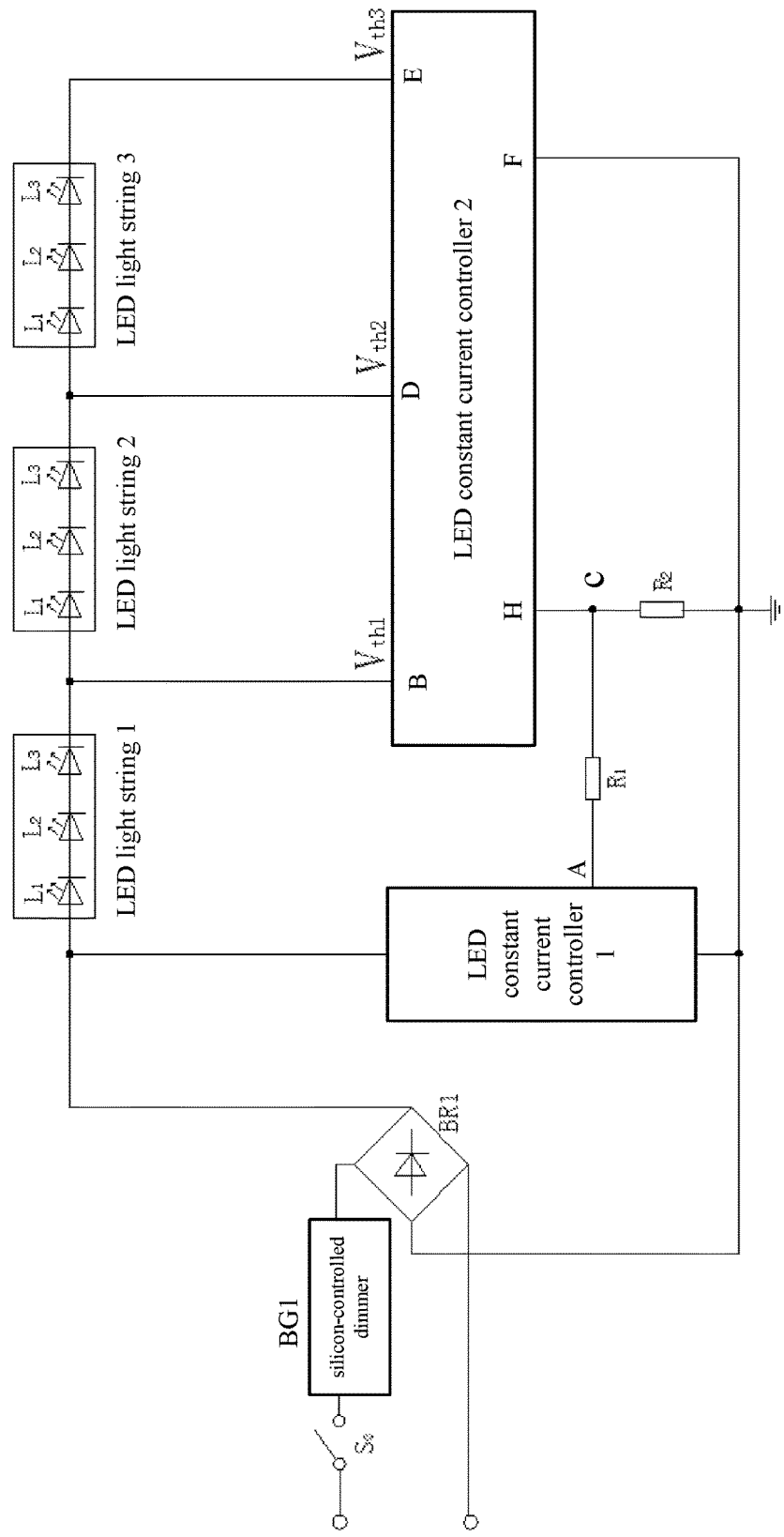
FIG. 3 is a structural schematic diagram of a circuit for an apparatus for controlling brightness of a mobile phone screen according to a second embodiment of the present invention.

FIG. 3 is a structural schematic diagram of a circuit for an apparatus for controlling brightness of a mobile phone screen according to a second embodiment of the present invention.

This embodiment is applicable to a linear three-string dimming LED driving circuit, as a specific embodiment, the rectifier processing module can adopt a bridge rectifier, taking an LED light source for the mobile phone screen as an example, the light source module can include a first LED light string, a second LED light string, a third LED light string, and a second LED constant current controller processing module to perform constant current control on the first LED light string, the second LED light string and the third LED light string, particularly, the first LED constant current controller processing module includes a first LED constant current controller and a first resistor, the second LED constant current controller processing module includes a second LED constant current controller and a second resistor, additionally, for ease of input power source control, a power switch also can be included, in particular, the apparatus for controlling brightness of a mobile phone screen in this embodiment mainly includes:

a power switch S0, a silicon-controlled dimmer BG1, a bridge rectifier BR1, two LED constant current controllers: LED constant current controller 1 (i.e., a first LED constant current controller) and LED constant current controller 2 (i.e., a second LED constant current controller), sampling resistors R1 and R2, an LED light string: LED light string 1 (i.e., the first LED light string), LED light string 2 (i.e., the second LED light string), LED light string 3 (i.e., the third LED light string), in practice, lamp beads of the first light string, the second light string and the third light string all have the same resistance to pressure and quantity, the number of lamp beads is at least one, in this embodiment, for example, there are all three or actually other numbers of lamp beads, which is not limited herein, and the specific connection relations of each element in the circuit are as follows:

the bridge rectifier BR1 is connected to the power supply via the power switch S0 and the silicon-controlled dimmer BG1, the positive phase output end of the bridge rectifier BR1 is connected to one end of the LED constant current driver 1 and the anode of the LED light string 1, the negative phase output end of the bridge rectifier BR1 is connected to other end of the LED constant current driver 1 and then grounded, the control terminal A of the LED constant current driver 1 is grounded via the sampling resistors R1 and R2; the cathode of the LED light string 1 is connected to the control terminal B of the LED constant current driver 2, and meanwhile, the cathode of the LED light string 1 is connected to the anode of the LED light string 2, the cathode of the LED light string 2 is connected to the control terminal D of the LED constant current driver 2, and meanwhile, the cathode of the LED light string 2 is connected to the anode of the LED light string 3, the cathode of the LED light string 3 is connected to the control terminal E of the LED constant current driver 2, the control terminal H of the LED constant current driver 2 is grounded via the sampling resistor R2, and the control terminal F of the LED constant current driver 2 is also grounded.

Hereinafter, the working process of the apparatus for controlling brightness of the mobile phone screen in this embodiment will be described in detail.

When the power switch is closed, within T1 period, the silicon-controlled dimmer BG1 is triggered to be switched on at time t1, the rectified bus voltage Vin continues to increase, when the rectified bus voltage $Vin > V_{LED\ light\ string\ 1}$, the LED light string 1 is ON, and meanwhile the LED constant current controller 1 detects the voltage at point A, when the voltage at point A is equal to the voltage at point C, the first constant current controller 1 is switched off, Vin continues to increase, the LED light string 1 turns bright gradually, that is, the mobile phone screen turns bright gradually, when the rectified bus voltage $Vin > V_{LED\ light\ string\ 1} + V_{LED\ light\ string\ 2}$, the LED light string 2 is ON, Vin continues to increase, LED light string 1 and LED light string 2 turn bright, that is, the mobile phone screen continues to turn bright, when the rectified bus voltage $Vin > V_{LED\ light\ string\ 1} + V_{LED\ light\ string\ 2} + V_{LED\ light\ string\ 3}$, the LED light string 3 is ON, Vin continues to increase, the brightness of LED light string 1, LED light string 2 and LED light string 3 continues to increase, that is, the mobile phone screen continues to turn bright, within T1 period, when the rectified bus voltage reaches the maximum, the brightness of three LED light strings also reaches the maximum, that is, the brightness of the mobile phone screen reaches the maximum;

Additionally, the LED constant current controller 2 drives three LED light strings, and controls the current of the three LED light strings, and then the current flowing through the three LED light strings respectively is: $I_{LED\ light\ string\ 1} = Vth1/R2$, $I_{LED\ light\ string\ 2} = Vth2/R2$, $I_{LED\ light\ string\ 3} = Vth3/R2$; within T1 period, when the rectified bus voltage Vin starts to decrease slowly, the brightness of the three LED light strings decreases correspondingly, when the rectified bus voltage $V_{LED\ light\ string\ 1} + V_{LED\ light\ string\ 2} < Vin < V_{LED\ light\ string\ 1} + V_{LED\ light\ string\ 2} + V_{LED\ light\ string}$, the LED light string 3 is OFF, that is, the mobile phone screen gets dark, Vin continues to decrease, when the rectified bus voltage $V_{LED\ light\ string\ 1} < Vin < V_{LED\ light\ string\ 1} + V_{LED\ light\ string\ 2}$, the LED light string 2 is OFF, that is, the mobile phone screen continues to get dark, when the rectified bus voltage $Vin < V_{LED\ light\ string\ 1}$, the LED constant current controller 1 detects the voltage at point A, when the voltage at point A is more than the voltage at point C, the LED constant current controller 1 is switched on, and meanwhile the LED constant current controller 2 is switched off, the LED light string 1 is OFF, the mobile phone screen is blacked out; the silicon-controlled dimmer BG1 is triggered to be switched off at time t2, the LED constant current controller 1 provides an anode forward current necessary to sustain conduction of the silicon-controlled dimmer BG1; while within T2 period, the silicon-controlled dimmer BG1 is triggered to be switched on at time t3, and the silicon-controlled dimmer BG1 is adjusted, when the rectified bus voltage $Vin > V_{LED\ light\ string\ 1}$, the LED light string is ON, that is, the mobile phone screen turns bright, and meanwhile the LED constant current controller 1 detects the voltage at point A, when the voltage at point A is equal to the voltage at point C, the LED constant current controller 1 is switched off, the above control process is repeated subsequently, and thus is not repeated herein.

To sum up, the apparatus for controlling brightness of a mobile phone screen in this embodiment drives a plurality of LED light strings (for example, three LED light strings in this embodiment) through the LED constant current driver 2, and is applicable to a linear three-string dimming LED driving circuit, and provides an anode forward current necessary to sustain conduction of the silicon-controlled dimmer through the LED constant current driver 1, so that the silicon-controlled dimmer can start up quickly in the next period, and the problem of screen flickering in a switch changeover state can be avoided, what's more, since the silicon-controlled dimmer is switched on quickly, the active power of the circuit can be improved, that is, the circuit realized therefrom has a high power factor, so it is easy to adjust, simple in structure, and low in the cost.

What is claimed is:

1. An apparatus for controlling brightness of a mobile phone screen, comprising a mobile phone screen display processing unit and further comprising a mobile phone screen brightness control unit connected to the mobile phone screen display processing unit, wherein the mobile phone screen brightness control unit particularly comprises:

a light source module, configured to provide a light source for the screen;

a rectifier processing module connected to the light source module, configured to rectify an input power source;

a silicon-controlled dimmer connected to the rectifier processing module, configured to adjust brightness of the light source; and a first constant current controller processing module connected to the rectifier processing module and the light source module, configured to provide an anode forward current necessary to sustain conduction of the silicon-controlled dimmer; wherein the light source module particularly comprises: a first light string and a second constant current controller processing module to perform constant current control on the first light string; wherein the first constant current controller processing module particularly comprises: a first constant current controller and a first resistor, and the second constant current controller processing module particularly comprises: a second constant current controller and a second resistor, the first resistor is connected to the second resistor via point C, one end of the second constant current controller is connected to the cathode of the first light string and the other end thereof is grounded, and the control terminal B is grounded via the second resistor, the positive phase output end of the rectifier processing module is connected to one end of the first constant current controller and the anode of the first light string, the negative phase output end of the rectifier processing module is connected to other end of the first constant current controller and then grounded, the control terminal A of the first constant current controller is grounded via the first resistor and the second resistor, when the first constant current controller detects that the voltage at point A is below the voltage at point C, the first constant current controller is switched off, when the first constant current controller detects that the voltage at point A is above the voltage at point C, the first constant current controller is switched on, to provide an anode forward current necessary to sustain conduction of the silicon-controlled dimmer.

2. The apparatus for controlling brightness of the mobile phone screen according to claim 1, wherein, the first light string comprises at least one LED lamp bead.

3. The apparatus for controlling brightness of the mobile phone screen according to claim 1, wherein, the light source module particularly comprises: a first light string, a second light string, a third light string and a second constant current controller processing module to perform constant current control on the first light string, the second light string and the third light string.

4. The apparatus for controlling brightness of the mobile phone screen according to claim 3, wherein, the first constant current controller processing module particularly comprises: a first constant current controller and a first resistor, and the second constant current controller processing module particularly comprises: a second constant current controller and a second resistor, the first resistor is connected to the second resistor via point C, the control terminal B of the second constant current controller is connected to the cathode of the first light string and the control terminal D is connected to the cathode of the second light string, the control terminal E is connected to the cathode of the third light string, and the control terminal F is grounded, and the control terminal H is grounded via the second resistor, the positive phase output end of the rectifier processing module is connected to one end of the first constant current controller and the anode of the first light string, the negative phase output end of the rectifier processing module is connected to other end of the first constant current controller and then grounded, the control terminal A of the first constant current controller is grounded via the first resistor and the second resistor, when the first constant current controller detects that the voltage at point A is below the voltage at point C, the first constant current controller is switched off, when the first constant current controller detects that the voltage at point A is above the voltage at point C, the first constant current controller is switched on, to provide an anode forward current necessary to sustain conduction of the silicon-controlled dimmer.

5. The apparatus for controlling brightness of the mobile phone screen according to claim 3, wherein, lamp beads of the first light string, the second light string and the third light string all have the same resistance to pressure and quantity.

6. The apparatus for controlling brightness of the mobile phone screen according to claim 5, wherein, the first light string, the second light string and the third light string have at least one lamp bead.

7. The apparatus for controlling brightness of the mobile phone screen according to claim 1, wherein, the rectifier processing module is a bridge rectifier.

8. The apparatus for controlling brightness of the mobile phone screen according to claim 1, further comprising an input control switch connected to the power supply.

* * * * *